Patented Jan. 2, 1945

2,366,425

UNITED STATES PATENT OFFICE 2,366,425

MOLDABLE MATERIALS AND METHOD OF MAKING SAME

Ferdinand Ringer, New York, N. Y.

No Drawing. Application May 4, 1943,
Serial No. 485,673

5 Claims. (Cl. 260—9)

This invention relates to a resinous moldable material of the thermosetting type and to the method of making same, and has for its general object the preparation of a material of this kind, having unexpectedly good qualities, from waste farm products such as corn cobs, corn stalks, oat hulls, peanut hulls, and the like by means of a simple and inexpensive process.

Phenolic resins such as phenol-formaldehyde and phenol-furfural are well known in the art, and with the addition of fillers are widely used for the preparation of general purpose plastics. Furfural is commonly prepared from the above mentioned according to generally known methods. It has also been proposed, and several methods have been suggested for this purpose and also patented, to use said waste farm products for the preparation of plastics by treating them with phenol or cresol, or especially by preparing lignin plastics through various treatments aimed at modifying the cellulosic material or at increasing the lignin content thereof.

It is the object of this invention to utilize said farm products for the preparation of a furfural plastic for general purposes having the good characteristics of the phenol-formaldehyde or phenol-furfural plastics, and to attain this result in the most advantageous manner by means of a simple method requiring a minimum of apparatus, in such a way as to utilize completely all of the components of the raw material, and to cause these components to become valuable elements in the preparation of the moldable material, the condensation reagents being furfural directly obtained from the raw material during the first stages of the treatment and a limited amount of one or more of a number of substances heretofore not used for this purpose.

The method comprises a number of steps in logical succession, each leading to a definite result having an important part in the formation of the final product. Briefly stated, it comprises the formation of furfural directly from the raw material during the first stages of the process, in an aqueous solution which is then used as such for condensation purposes without extracting the furfural therefrom; the yield in furfural is a maximum owing to an appropriate characteristic initial step. The condensation is effected, under peculiar conditions, with a limited amount of one or more of the following substances: alpha- or betanaphthol, a natural resin such as rosin, a resin acid such as abietic acid, aniline, without addition of any of the substances used in the practice for the condensation with furfural. The raw material through the formation of furfural is converted into a residual cellulosic material which partly serves as reagent inasmuch as it still contains a certain amount of furfural, and primarily acts as a well prepared lignin filler.

My method might be regarded as the combination of two separate processes: 1. An initial process leading to the formation of a maximum amount of furfural, during which the lignin containing raw material is also prepared as a filler. 2. Condensation and evaporation of the furfural solution with a reagent not used in the art for this purpose. The formation of the resin takes place in the presence of the furfural containing lignin filler, and it is thought that this is a notable feature which leads to an improvement in the final product.

It should be noted that the procedure followed makes also possible to dispense with the addition of catalysts for the condensation stage as the same mineral acids that are used during the initial treatment leading to the formation of furfural, act as catalysts in the condensation reaction.

A more detailed description of the method will now be given, it being understood that the invention is not limited to the specific examples and proportions given and that modifications may be made without departing from the spirit of the invention.

Dried corn cobs, for example, are used as raw material after having been subdivided into pieces of 0.5" to 1" width; it is obvious that the drying of the material may be dispensed with if the percentage in moisture of the raw material is known.

To 250 parts by weight of dried material there are added 750 parts by weight of water and about 2 parts of sulphuric acid (of 95% concentration). The mixture is slowly cooked at atmospheric pressure for about 30 minutes. After this cooking, there are added to the mixture about 2 more parts by weight of sulphuric acid and about 2.5 parts of hydrochloric acid (of 37% concentration), and the mixture is subjected to a further cooking in autoclave under a pressure of 75 to 100 lbs. for approximately 2-3 hours, at the temperature of 300° to 350° F.

The process has been carried out, for example, using 250 gr. of dried subdivided corn cobs, 750 gr. of water, and the suitable amount of sulphuric and hydrochloric acid according to the aforementioned proportions. After the cooking under pressure, the content is poured out of the autoclave, and the solution (about 800 gr. including the water taken from the bottom of the autoclave which also contains a small amount of furfural) is separated by filter pressing from the cellulosic material (about 160 gr. after pressing) which still remains somewhat moist. This latter is then ground to a powder in order to insure a uniform distribution of the material during the condensation.

It has been ascertained that there are present in the residual cellulosic material up to 7 gr. of furfural, while the solution contains as much as 27 to 33 gr. of this substance, that is the yield in furfural may reach up to 14% of the weight of the corn cobs used. The procedure described leads therefore to the conversion of the pentosans contained in the raw material into furfural in a simple and economical manner with a greater yield than obtained according to the methods usually employed. This is due to the preliminary slow cooking at atmospheric pressure to which the pentosan containing material has been subjected, and to the higher proportion of mineral acid employed in comparison with the methods generally adopted.

The aqueous solution of furfural and the residual cellulosic material, which contains furfural and other water solubles, are mixed together with the addition of a condensation reagent such as: alpha- or beta-naphthol, rosin or other natural resins, a resin acid, aniline, or of two of these substances. For instance, beta-naphthol and rosin may be very advantageously used together. In laboratory work there is a loss in furfural due to the escaping of furfural vapors during the emptying of the autoclave, and it has been found advisable to add to the 800 gr. of aqueous solution of furfural about 200 gr. of a furfural containing aqueous solution separately prepared according to the same method. In case of industrial production, the escaping of furfural vapors should be prevented.

The following proportions of ingredients are given by way of example:

1

| | Grams |
|---|---|
| Aqueous solution of furfural prepared as described above | 800 to 1,000 |
| Beta-naphthol | 17 |
| Rosin | 20 |
| Residual cellulosic material (still moist) | 160 |

2

| | Grams |
|---|---|
| Aqueous solution of furfural prepared as described above | 800 to 1,000 |
| Beta-naphthol | 15 |
| Rosin | 18 |
| Residual cellulosic material (still moist) | 160 |

3

| | Grams |
|---|---|
| Aqueous solution of furfural prepared as described above | 800 to 1,000 |
| Aniline | 15 |
| Rosin | 20 |
| Residual cellulosic material (still moist) | 160 |

4

| | Grams |
|---|---|
| Aqueous solution of furfural prepared as described above | 800 to 1,000 |
| Beta-naphthol | 35 |
| Residual cellulosic material (still moist) | 160 |

Condensation and evaporation of the water are then slowly effected by heating the mixture for the necessary length of time, preferably at a constant temperature of about 120° to 140° C., and the heating is prolonged until the material becomes hard and crusty. The material is then disintegrated and reduced to a powder, which is again subjected for a while to a temperature of about 120° to 140° C. The powder is thoroughly washed, for instance in a filter press, and the washing is prolonged until the filtrate become limpid in order to remove all water solubles. The powder is finally dried and is then ready for pressure molding.

The conditions of the molding are about the same as those required for a phenol-formaldehyde plastic, that is a pressure of about 2000 to 5000 lbs. per square inch at a temperature of 340° to 390° F. As the powder has excellent plastic properties and flows readily, no plasticizer and lubricant have to be used for the molding process, though, of course, plasticizers, lubricants and accelerators may be employed if desired. Other fillers may also be substituted for the lignin filler if particular properties of the plastic are desired for particular purposes.

The final product has all the characteristics of a superior general purpose plastic as it has an exceedingly high dielectric strength, very satisfactory tensile, compressive, impact and flexural strength, and an excellent finish.

The product has been subjected to exhaustive scientific tests and the following are some of the data that have been ascertained:

| | |
|---|---|
| Specific gravity | 1.37 |
| Tensile strength (p. s. i.) | 8,000 |
| Compressive strength (p. s. i.) | 24,000 |
| Impact strength (f. p.) | 0.28 |
| Dielectric strength (v./m.) | 450 |
| Rockwell hardness | 106 |

What I claim is:

1. A process for making a moldable plastic material from a raw material consisting of a pentosan containing farm product, comprising cooking said raw material in a diluted solution of a mineral acid for a limited time at atmospheric pressure, subjecting the product of said cooking to a further cooking under pressure after addition of a further amount of mineral acid, adding to the resulting material a small amount of a condensation reagent from the group consisting of alpha- and beta-naphthol and aniline and a small amount of a reagent from the group consisting of the natural resins and the resin acids, and subjecting said material to condensation, evaporation, washing and drying.

2. A process for making a moldable plastic material from a raw material consisting of a pentosan containing farm product, comprising cooking the dried raw material for about 30 minutes at atmospheric pressure in water in the presence of sulphuric acid of 95% concentration, the water being about 300% and the sulphuric acid about 0.8% on the weight of said dried raw material, adding to the cooking mixture a further amount of about 0.8% of sulphuric acid and about 1% of hydrochloric acid of 37% concentration, cooking said mixture under a pressure of about 75 to 100 lbs. at the temperature of approximately 300° to 350° F. for 2 to 3 hours, adding to the resulting material a small amount of a substance taken from the group consisting of alpha- and beta-naphthol and aniline, and a small amount of a substance taken from the group consisting of the natural resins and the resin acids, the total amount added being about 14% on the weight of the dried raw material, and heating said material until a hard crusty mass is obtained.

3. A process for making a moldable plastic material from a pentosan containing farm product, comprising cooking the subdivided farm product in a diluted solution of a mineral acid for a limited time at atmospheric pressure, subjecting the product of said cooking to a further cooking under pressure after addition of a further amount of mineral acid, adding to the resulting material a small amount of a condensation reagent taken from the group consisting of alpha- and beta-naphthol and aniline, and a small amount of rosin, and subjecting said material to condensation, evaporation, washing and drying.

4. A process for making a moldable plastic material from a raw material consisting of a pentosan containing farm product, comprising cooking said raw material in a diluted solution of a mineral acid for a limited time at atmospheric pressure, subjecting the resulting product to a further cooking under pressure after addition of a further amount of mineral acid, to obtain a solution of furfural and a residual furfural containing cellulosic material, and condensing said furfural solution in the presence of said residual cellulosic material with a reagent from the group consisting of alpha- and beta-naphthol and aniline and a reagent from the group consisting of the natural resins and the resin acids, the total amount of said reagents being approximately equal to the total amount of said reagents being approximately equal to the total amount of furfural contained in the furfural solution and in the residual cellulosic material.

5. A process for making a moldable plastic material from a raw material consisting of a pentosan containing farm product, comprising cooking the dried raw material for about 30 minutes at atmospheric pressure in water in the presence of sulphuric acid of 95% concentration, the water being about 300% and the sulphuric acid about 0.8% on the weight of the dried raw material, adding to the cooking mixture a further amount of about 0.8% of sulphuric acid and about 1% of hydrochloric acid of 37% concentration, cooking said mixture under a pressure of about 75-100 lbs. at the temperature of 300° to 350° F. for 2 to 3 hours, to obtain a material comprising an aqueous solution of furfural and a furfural containing cellulosic residue, adding to said material a condensation reagent from the group consisting of alpha- and beta-naphthol and aniline and a further reagent from the group consisting of the natural resins and the resin acids, the total amount of said reagents being approximately equal to the total amount of furfural contained in said aqueous solution and in the cellulosic residue, and heating said material until a hard crusty mass is obtained.

FERDINAND RINGER.